US007702641B2

(12) United States Patent
Holtz et al.

(10) Patent No.: US 7,702,641 B2
(45) Date of Patent: Apr. 20, 2010

(54) METHOD AND SYSTEM FOR COMPARING AND UPDATING FILE TREES

(75) Inventors: Brian Holtz, San Carlos, CA (US); Vijay Balasubramanian, San Jose, CA (US); Nidheesh Dubey, Fremont, CA (US); Aseem Sharma, Sunnyvale, CA (US); Vivek Pandey, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1899 days.

(21) Appl. No.: 10/021,943

(22) Filed: Dec. 12, 2001

(65) Prior Publication Data

US 2002/0184252 A1 Dec. 5, 2002

Related U.S. Application Data

(60) Provisional application No. 60/296,065, filed on Jun. 4, 2001.

(51) Int. Cl.
*G06F 17/30* (2006.01)
*G06F 7/00* (2006.01)

(52) U.S. Cl. .................. 707/101; 707/102; 707/103 R (58) Field of Classification Search ............... 707/1–10, 707/100–104.1, 200–205
See application file for complete search history.

(56) References Cited

U.S. PATENT DOCUMENTS 4,558,413 A 12/1985 Schmidt et al.

(Continued)

FOREIGN PATENT DOCUMENTS

EP 0 684 558 A1 11/1995

OTHER PUBLICATIONS

Sudarshan S. Chawathe and Hector Garcia-Molina, "Meaningful Change Detection in Structured Data," Proceedings of the 1997 ACM SIGMOD International Conference on Management of Data, 1997, pp. 26-37, XP-002228386.

(Continued)

*Primary Examiner*—Tim T. Vo
*Assistant Examiner*—Sangwoo Ahn
(74) *Attorney, Agent, or Firm*—Marsh Fischmann & Breyfogle LLP (57) ABSTRACT

The embodiments of the present invention provide a method for comparing file tree descriptions and generating a sequenced log of changes that transform an old file tree to a new file tree. According to one embodiment, the inputs to this comparator are two tree-structured descriptions called file tree indices, and the outputs are a sequence of file tree operations that can transform the old tree to the current tree. According to another embodiment, the comparator has two top level steps, where at step one it recursively goes through the old file tree index and compares each folder along with its children with that of the corresponding file tree generating a raw operation log, and at step two after the recursion is done, the comparator processes the raw operation log and optimizes certain sets of operations by transforming them into single operations.

15 Claims, 9 Drawing Sheets

U.S. PATENT DOCUMENTS

| | | | | |
|---|---|---|---|---|
| 5,202,971 | A | * | 4/1993 | Henson et al. .................. 707/8 |
| 5,588,147 | A | | 12/1996 | Neeman et al. |
| 5,600,834 | A | | 2/1997 | Howard |
| 5,649,200 | A | * | 7/1997 | Leblang et al. .............. 717/122 |
| 5,706,509 | A | * | 1/1998 | Man-Hak Tso ............. 707/201 |
| 5,778,389 | A | | 7/1998 | Pruett et al. |
| 5,842,213 | A | * | 11/1998 | Odom et al. ................. 707/100 |
| 6,098,078 | A | | 8/2000 | Gehani et al. |
| 6,243,705 | B1 | | 6/2001 | Kucala |
| 6,343,299 | B1 | | 1/2002 | Huang et al. |
| 6,925,476 | B1 | * | 8/2005 | Multer et al. ............... 707/200 |
| 2002/0194209 | A1 | * | 12/2002 | Bolosky et al. ............. 707/205 |

OTHER PUBLICATIONS

Jason T. L. Wang, et al., "A Tool for Tree Pattern Matching," Proceedings of the International Conference on Tools for Artificial Intelligence, San Jose, CA, Nov. 5-8, 1991, pp. 436-444, XP-010025519.

S. Balasubramaniam and Benjamin C. Pierce, "What is a File Synchronizer?" MOBICOM '98. Proceedings of the $4^{TH}$ Annual ACM/IEEE International Conference on Mobile Computing and Networking, Dallas, TX, Oct. 25-30, 1998, pp. 98-108, XP-000850260.

Prabhu Ram and Lyman Do, "Extracting Delta for Incremental Data Warehouse Maintenance", Jun. 2000, pp. 220-229, Phantom Works Mathematics and Computing Technology, Seattle, Washington.

* cited by examiner

METHOD AND SYSTEM FOR COMPARING AND UPDATING FILE TREES

RELATED APPLICATION

This application claims the benefit of United States Provisional Patent Application No. 60/296,065 filed Jun. 4, 2001, the disclosure of which is hereby incorporated by reference.

BACKGROUND OF THE INVENTION

1. Field of the Invention

The present invention relates to file systems, and in particular to a method for comparing two file tree descriptions and generating a sequenced log of changes that transforms an old tree to a new tree.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

A way to organize files and folders of a user on a computer is by arranging them in a structure commonly known as a tree. Oftentimes, files and folders are changed. When this happens, a new tree is generated. It is helpful sometimes to know the differences between the old and new trees. Finding these differences currently is very difficult, as will be further explained below. Before discussing this problem, however, an overview of a tree data structure is provided.

Tree Data Structure

Figure 1:
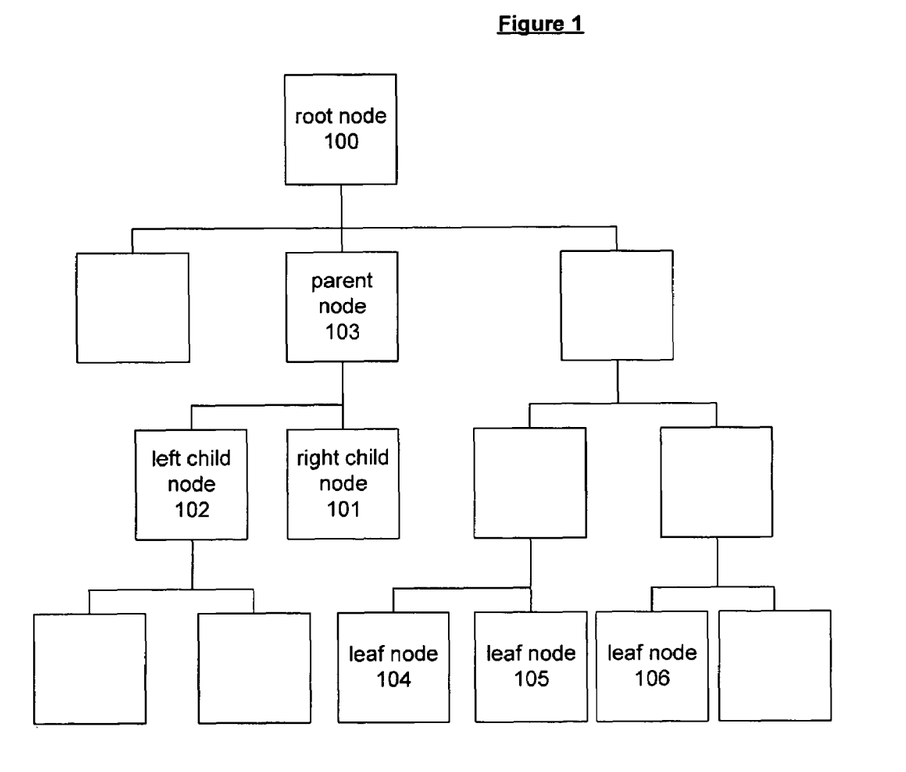
FIG. 1 is an illustration of a file tree data structure.

A tree data structure is illustrated in FIG. 1. Apex of the tree 100 is commonly called the root. The root is usually a folder that contains all other sub-folders and files of a user. The root is the starting location of all folders and files of a computer user from where links spread out like branches of a tree to other sub-folders and files.

The nodes of the tree (i.e., the actual files) are denoted by parent, child, leaf, and non-leaf nodes. A parent is any node that has a branch leading down to one or more lower nodes. In FIG. 1, root 100 is one example of a parent. A child is any node that has a branch leading up to a higher node. Referring again to FIG. 1, all nodes except the root is a child node. This child node category can be further segregated into left and right child depending upon the location of the child node with respect to its parent. Node 101 is a right child node, while node 102 is a left child node of parent node 103. A leaf node is any node that does not have any branches leading to lower levels in the tree. All nodes at the bottom most level of the tree (for example, 104, 105, and 106) are leaf nodes. In contrast, all other nodes are categorized as non-leaf nodes as they have a child node under them (for example, 100).

Tree Modification

When a user makes changes to the folders and files, for instance by deleting or adding a file or changing its contents, these changes have to be correctly incorporated into the tree. Typically, a new tree is generated every time a change is made. The new tree is then compared to the old tree, and all necessary changes are merged to create one updated tree. This requires that the old state be remembered and compared with the new state every time the tree changes, which is wasteful of resources.

File Tree Comparator

A less wasteful way to compare two trees is with a file tree comparator. A file tree comparator compares two file tree descriptions and generates a sequenced log of changes that transforms the old tree to a new tree.

There are several commercially available comparators that find the differences in two file tree structures. One file tree comparator is called Xfiles. Xfiles allows the comparing and the merging of two file trees over a network. In operation, Xfiles traverses a file tree and reports any files that are missing, or are different.

The main drawback with Xfiles is that the entire tree must be traversed in order to find any missing or different files. Many trees are extremely large. In this case a substantial amount of time might be wasted traversing large portions of the tree that are not modified. Moreover, if the network connection is slow, or network traffic high, Xfiles becomes prohibitively wasteful of resources.

Another file tree comparator, termed Teamware, includes methods for finding differences in file trees, with the assumption that the file trees are of a special type—containing only source code control system (SCCS) folders and files—that are directly annotative. Using Teamware, developers each may be assigned a separate sub-directory of a single root directory designated as a parent workspace for the current project. The parent workspace contains the original copies of each project file and records of each set of changes, also called deltas, to each file.

The developers obtain copies of project files for reading and editing purposes within their individual workspaces, and record any modifications they make in a central location later on. A locking mechanism in SCCS prevents two developers from checking out the same file for editing at the same time. Teamware, however, is restricted because it only works on SCCS files and folders, so, Teamware has no application to most file tree systems.

Another file tree comparator is called Unison. Unison is a file synchronization tool for the Unix and the Windows operating systems. It allows two replicas of a collection of files, folders, or directories to be stored on different hosts or different disks on the same host, modified separately, and then brought up to date by propagating the changes in each replica to the other. Unison sends from one side (server or client) to the other the entire log, and makes the receiving side responsible for finding the differences in the files, folders, and directories of both sides. This system works well only because the utility has an indefinitely growing version log for each synced file, which is pruned only when all known synchronizers have seen the pruned versions. There is a time limit (usually a month) when the utility abandons files that have not been synced in order to prune the size of the log.

Unison, however, creates a log for the entire file tree and sends it across the network. If the file tree is large, the time involved in transmitting the log for the entire file tree can be time consuming, especially if the network connection is slow, or the network is highly congested. Moreover, a file not in use beyond the time limit is automatically abandoned by the log. If a user attempts to make certain changes to it, they may not be reflected in the log that is sent across to the other side.

BRIEF SUMMARY OF THE INVENTION

The embodiments of the present invention provides a method for comparing file tree descriptions and generating a sequenced log of changes that transform an old file tree to a new file tree. According to one embodiment, the inputs to this comparator are two trees. The comparator in this embodiment traverses one of the trees and compares it to the other tree and generates a log that transforms one of the trees into the other.

According to another embodiment, the tree-structured descriptions, called file tree indices are obtained. In this embodiment, a sequence of file tree operations are outputted that can transform the old tree to the current tree. According to another embodiment, the comparator has two top level steps. In the first step it recursively goes through the old file tree index and compares each folder along with its children with that of the corresponding file tree generating a raw operation log. In the second step the comparator processes the raw operation log and optimizes it. In one embodiment, the optimization comprises of transferring certain sets of operations into single operations.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The embodiments of the present invention pertain to a file tree comparator. In the following description, numerous specific details are set forth to provide a more thorough description of embodiments of the invention. It will be apparent, however, to one skilled in the art, that the embodiments of the present invention may be practiced without these specific details. In other instances, well known features have not been described in detail so as not to obscure the invention.

File Tree Comparator

Figure 2:
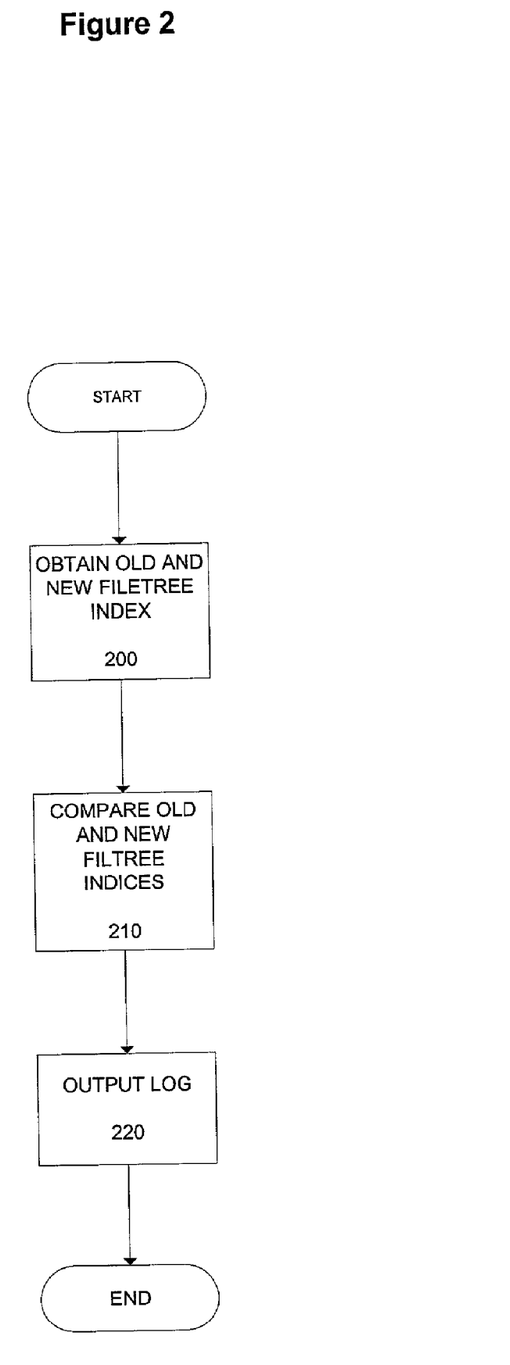
FIG. 2 is a flowchart of one embodiment of the present invention.

A file tree comparator, according to one embodiment of the present invention is shown in FIG. 2. At block 200, the comparator takes as its input two tree-structured descriptions (called file tree indices). The file tree indices represent the old and current states of the file tree. At block 210 the old and current states of the file tree are compared. At block 220 a sequence of file tree operations are outputted. The sequence of file tree operations are designed to transform the old tree to the current tree.

Figure 3:
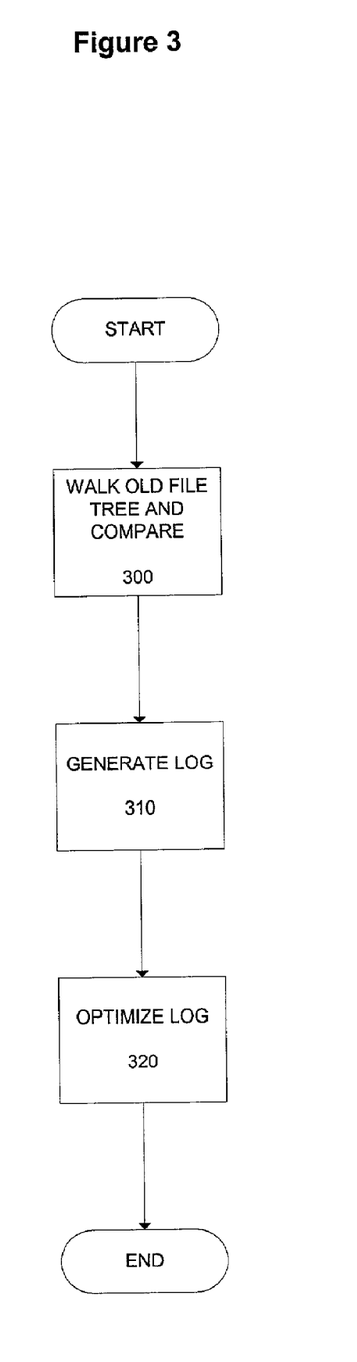
FIG. 3 is a flowchart of another embodiment of the present invention.

Another embodiment of the present invention is shown in FIG. 3. At block 300, the comparator walks through the old file tree index, and compares each folder's children with the children of the corresponding folder, if one exists, in the current file tree index. At block 310, the comparator generates a raw operation log. At block 320, the log is optimized.

Figure 4:
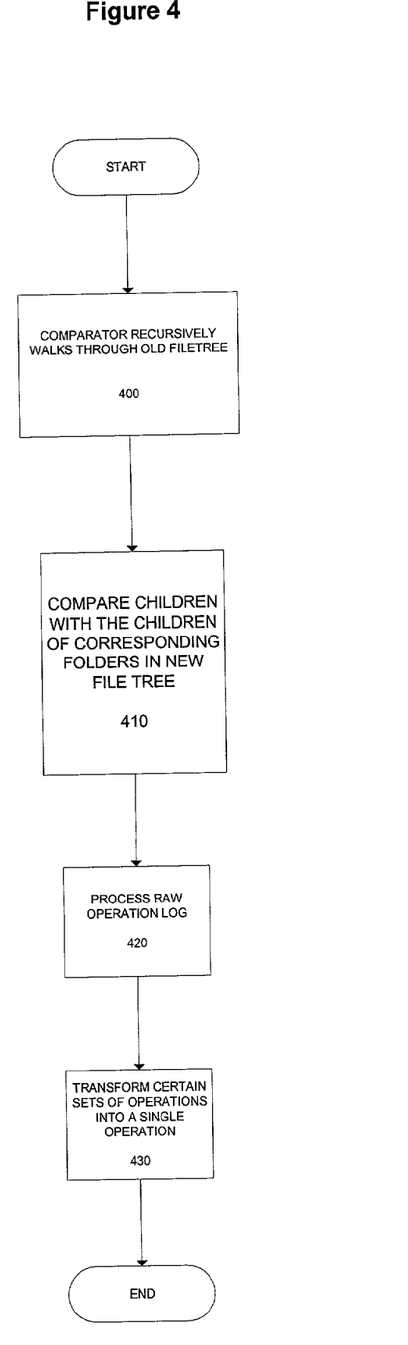
FIG. 4 is a flowchart of one embodiment of the present invention to optimize the raw operation log.

FIG. 4 is one embodiment of the present invention to optimize the log. At block 400, the comparator recursively walks through the old file tree index. At block 410, it compares each folder's children with the children of corresponding folders in the new file tree. At block 420, the comparator generates a raw operation log. At block 430, the log is optimized by transforming certain sets of operations into a single operation.

Walking the Tree

Figure 5:
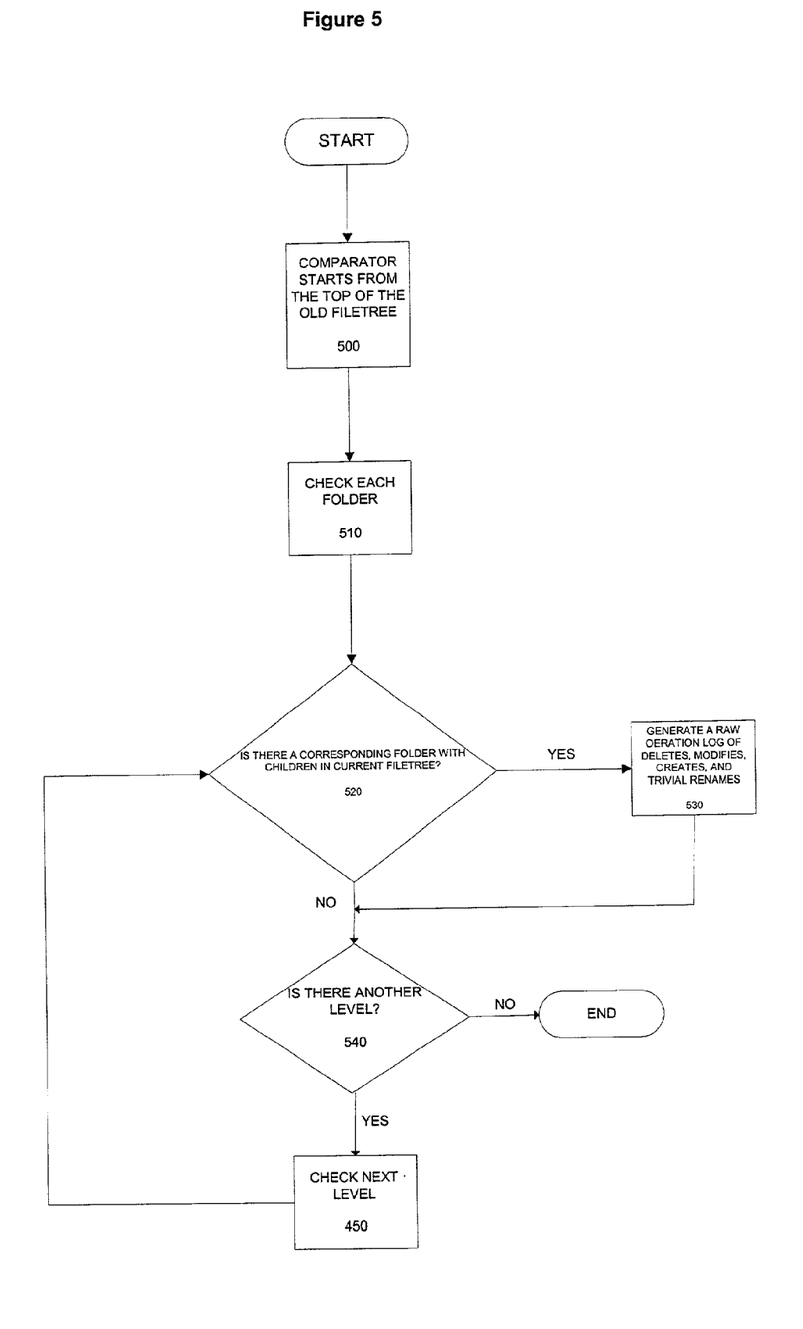
FIG. 5 is a flowchart elaborating blocks 400 and 410 of FIG. 4 above.

Walking the old tree refers to the process of traversing some or all of the nodes of the old tree and optimally performing some calculations at each node. Blocks 400 and 410 of FIG. 4 are one embodiment of how the old tree is walked. FIG. 5 shows another embodiment of how the old tree is walked. At block 500, the comparator starts comparing folders from the top (root) of the file tree. At block 510, it winds its way down the tree checking each folder. At block 520, the comparator checks to see if there is a corresponding folder with children in the current file tree index. If one is found, then at block 530, the comparator generates a raw operation log of creates, deletes, modifies, and trivial renames. These trivial renames are those names that occur without a re-parenting. If one is not found, then at block 540, the comparator checks if there is another lower level in the tree. If there is one, then at block 550, the next lower level in the tree is checked before going back to block 520. If on the other hand, there is no lower level in the tree, the comparator has reached the bottommost level, and the comparison ends.

Operation Log

Figure 6:
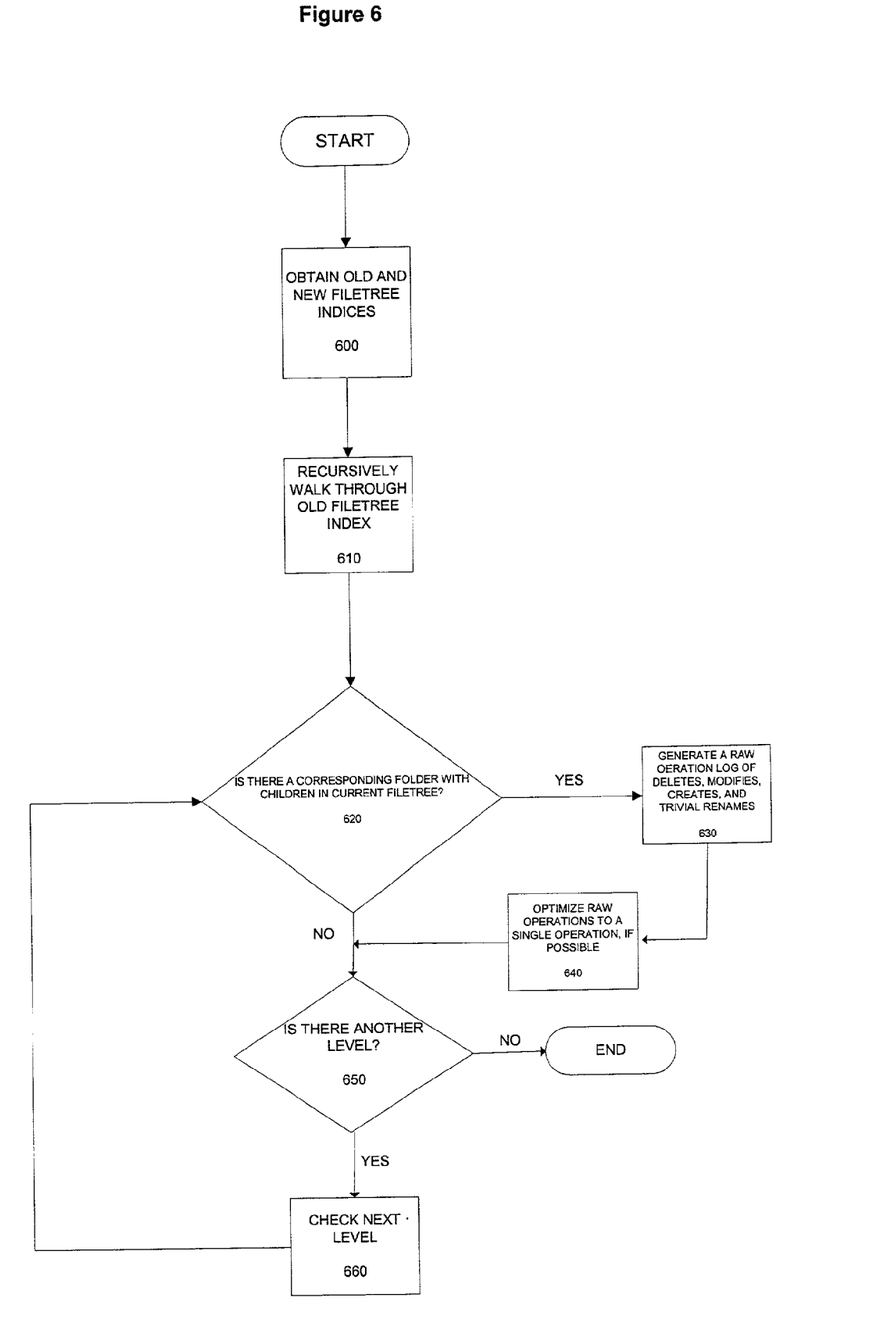
FIG. 6 is a flowchart of one embodiment of the present invention to generate the raw operation log.

FIG. 6 is one embodiment of the present invention that generates a raw operation log. Sometimes inefficiencies may be generated by systems that log operations as they happen. These efficiencies are handles as follows: at block 600, the old and new file tree indices are obtained. At block 610, the comparator recursively walks down the old file tree index. At block 620, the comparator checks to see at each level if there is a corresponding folder with children in the current file tree index. If one is found, then at block 630 the comparator generates a raw operation log of creates, deletes, modifies, and trivial renames before going to block 640 where certain raw operation logs are optimized to a single operation for the sake of efficiency. If at block 620 there is no corresponding folder with children in the current file tree index, then at block 650 the comparator checks to see if there is another lower level. If there is one, then at block 660 the comparator checks the next lower level before going back to block 620. If on the other hand, there is no lower level, the comparator has reached the bottommost level, and the comparison ends.

Figure 7:
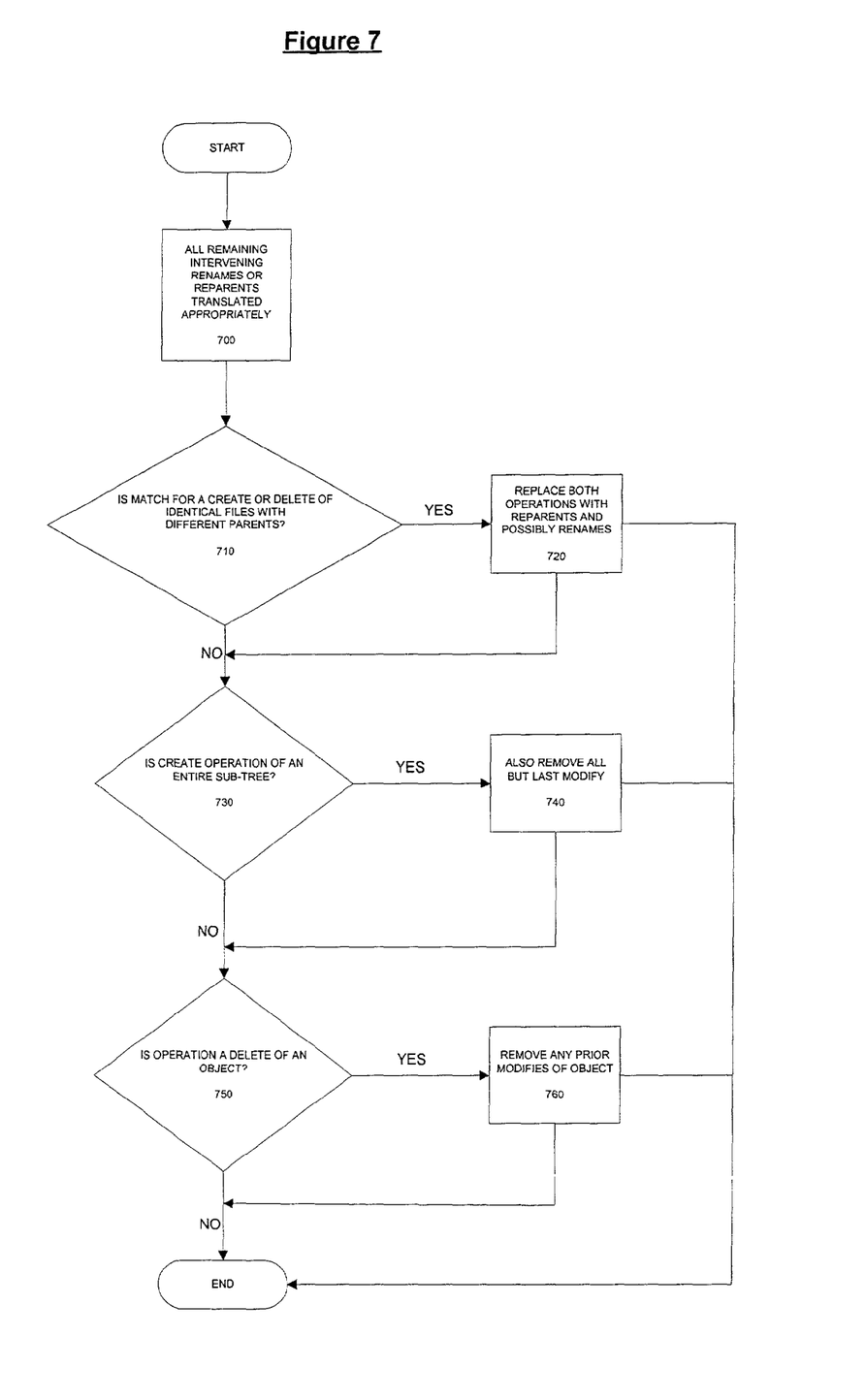
FIG. 7 is a flowchart of another embodiment of the present invention to generate the raw operation log.

FIG. 7 is another embodiment of the present invention to generate the raw operation log. At block 700, all remaining intervening renames or reparents among the matched operations are translated appropriately. At block 710, if the match is for a create or delete of identical files with different parents, the comparator replaces those two operations with a reparent and possibly a rename at block 720 before going to block 730. At block 730, if the replaced create operation is of an entire sub-tree, then at block 740 the comparator also removes all but the last modify before going to block 750. This helps in freeing some of the space in memory.

At block 750, if the comparator finds a delete of an object, it removes any prior modifies of that object at block 760. This further helps in freeing memory space. The comparator does not, however, remove any renames, creates, or reparents, since those can be clobbering operations that might require leaving an explicit delete in their place. This is because leaving such explicit deletes may get confusing if their associated original clobbering operation is not there anymore.

Embodiment of a Computer Execution Environment

Figure 8:
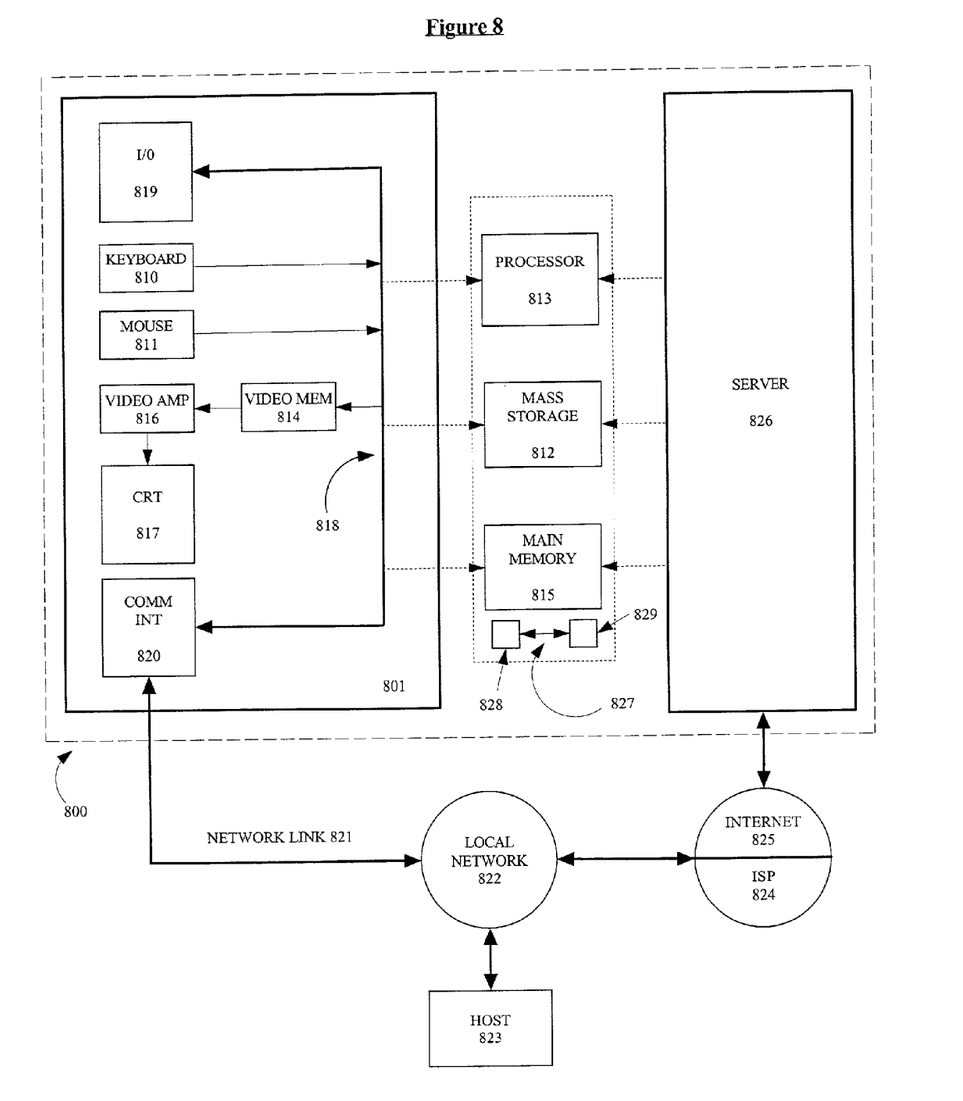
FIG. 8 is an illustration of an embodiment of a computer execution environment.

An embodiment of the invention can be implemented as computer software in the form of computer readable code executed in a desktop general purpose computing environment such as environment 800 illustrated in FIG. 8, or in the form of bytecode class files running in such an environment. A keyboard 810 and mouse 811 are coupled to a bi-directional system bus 818. The keyboard and mouse are for introducing user input to a computer 801 and communicating that user input to processor 813.

Computer 801 may also include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals, which carry digital data streams representing various types of information.

Network link 821 typically provides data communication through one or more networks to other data devices. For example, network link 821 may provide a connection through local network 822 to local server computer 823 or to data equipment operated by ISP 824. ISP 824 in turn provides data communication services through the world wide packet data communication network now commonly referred to as the "Internet" 825. Local network 822 and Internet 825 both use electrical, electromagnetic or optical signals, which carry digital data streams. The signals through the various networks and the signals on network link 821 and through communication interface 820, which carry the digital data to and from computer 800, are exemplary forms of carrier waves transporting the information.

Processor 813 may reside wholly on client computer 801 or wholly on server 826 or processor 813 may have its computational power distributed between computer 801 and server 826. In the case where processor 813 resides wholly on server 826, the results of the computations performed by processor 813 are transmitted to computer 801 via Internet 825, Internet Service Provider (ISP) 824, local network 822 and communication interface 820. In this way, computer 801 is able to display the results of the computation to a user in the form of output. Other suitable input devices may be used in addition to, or in place of, the mouse 801 and keyboard 800. I/O (input/output) unit 819 coupled to bi-directional system bus 818 represents such I/O elements as a printer, A/V (audio/video) I/O, etc.

Computer 801 includes a video memory 814, main memory 815, and mass storage 812, all coupled to bi-directional system bus 818 along with keyboard 810, mouse 811 and processor 813, and file tree comparator 827 which compares file tree descriptions 828 (old file tree index) and 829 (new file tree index). Whenever a user makes a change, a new file tree description (829) is created, which is compared with the old file tree description (828) to generate an updated file tree description.

As with processor 813, in various computing environments, main memory 815 and mass storage 812, can reside wholly on server 826 or computer 801, or they may be distributed between the two. Examples of systems where processor 813, main memory 815, and mass storage 812 are distributed between computer 801 and server 826 include the thin-client computing architecture developed by Sun Microsystems, Inc., the palm pilot computing device, Internet ready cellular phones, and other Internet computing devices.

The mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 also includes, for example, a 32-bit data bus for transferring data between and among the components, such as processor 813, main memory 815, video memory 814, and mass storage 812. Alternatively, multiplex data/address lines may be used instead of separate data and address lines.

In one embodiment of the invention, the processor 813 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 815 is comprised of dynamic random access memory (DRAM). Video memory 814 is a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images.

Computer 801 can send messages and receive data, including program code, through the network(s), network link 821, and communication interface 820. In the Internet example, remote server computer 826 might transmit a requested code for an application program through Internet 825, ISP 824, local network 822 and communication interface 820. The received code may be executed by processor 813 as it is received, and/or stored in mass storage 812, or other non-volatile storage for later execution. In this manner, computer 800 may obtain application code in the form of a carrier wave. Alternatively, remote server computer 826 may execute applications using processor 813, and utilize mass storage 812, and/or video memory 815. The results of the execution at server 826 are then transmitted through Internet 825, ISP 824, local network 822, and communication interface 820. In this example, computer 801 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, and servers on a network.

The computer systems described above are for purposes of example only. An embodiment of the invention may be implemented in any type of computer system or programming or processing environment.

Figure 9:
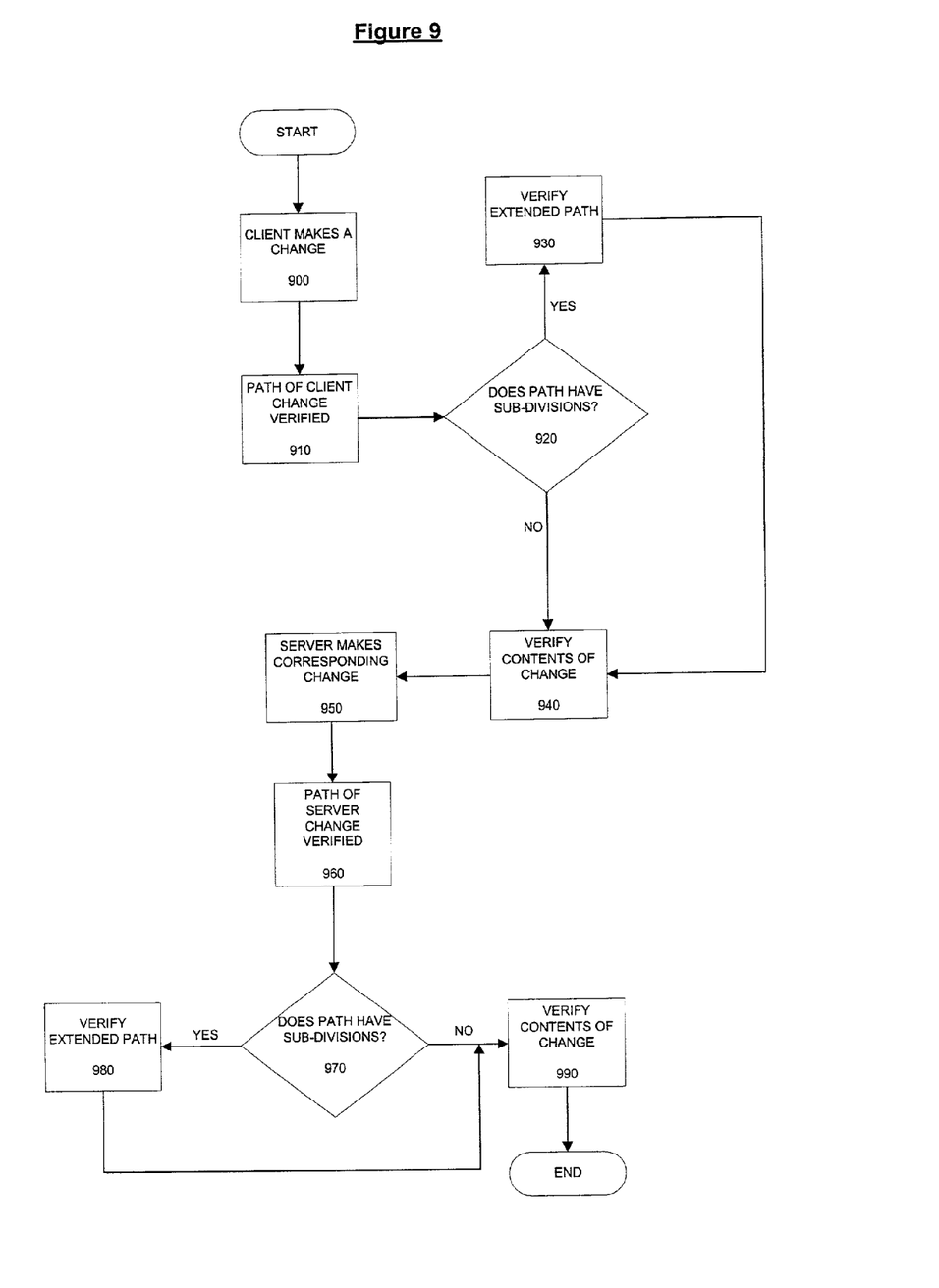
FIG. 9 is a flowchart illustrating an initial synchronization between a client and a server.

FIG. 9 illustrates an example of an initial synchronization in which a client starts with a file, for example, "Status.html" and a server starts with a file, for example, "PseudoRegistry.java" inside a folder, for example, "src". At block 900, a client makes a change, for example to add contents to file Status.html. At block 910, the path of the client change is verified, for example Status.html. At block 920, a check is made to verify if the path has any sub-divisions. In the example, the client makes addition to a file, which lies in the root directory of the client, so there is no further sub-divisions. At block 930, if the path has sub-divisions, then the extended path of the client change is verified before going to block 940, else at block 940 the contents of the change are verified, for example <!doctype html public "-//w3c//dtd html [...]>.

Next at block 950, a server makes the corresponding changes based on the client changes, for example to add contents to src. At block 960, the path of the server change is verified, for example src. At block 970, a check is made to verify if the path has any sub-divisions. In the example src is a directory that contains file PseudoRegistry.java where the additions have to be made. At block 980, if the path has sub-divisions, for example src/PseudoRegistry.java, then the extended path of the server change is verified before going to block 990, else at block 990 the contents of the change are verified, for example <package com.sun.PortalSyncServer; impor [...]>.

An example of a client's version of its "briefcase index tree" that is used to detect subsequent changes on its side after a synchronization operation described above may look like:

Objects to check for changes(1):
  MappedContentIndex
  path=/tmp/mirror/
  ContentIndex
  children(2):
  ContentIndex
  path=Status.html
  content signature: OAhokamqGRL01a1cS
  MappedContentIndex
  path=src
  content signature: rXARIRMIcOQmcxo4n6
  ContentIndex
  children(1):
  ContentIndex
  path=src/PseudoRegistry.java
  content signature: snMGfFSnaO1gqZV.

It should be noted here that while /tmp/mirror/ is a container for objects that are in the partnership, the container itself is not in the partnership. In other words, if the container gets renamed, then that change is not propagated to the other side.

Since there are no conflicts, the server tree is identical to the client's tree, except for the path of the synchronized folder. An example of a server's version of its "briefcase index tree" as a result of subsequent changes on its side after a synchronization operation described above may look like:

Objects to check for changes(1):
  MappedContentIndex
  path=/home/username/directoryname/ (for example, /home/john/master/)
  ContentIndex
  children(2):
  ContentIndex
  path=Status.html
  content signature: OAhokamqGRL01a1cS
  MappedContentIndex
  path=src
  content signature: rXARIRMIcOQmcxo4n6
  ContentIndex
  children(1):
  ContentIndex
  path=src/PseudoRegistry.java
  content signature: snMGfFSnaO1gqZV Thus, a comparator is described in conjunction with one or more specific embodiments. The embodiments of the present invention are defined by the following claims and their full scope of equivalents.

We claim:

1. A method for comparing file tree descriptions comprising:
  by a computer having a processor and a memory communicatively coupled to the processor, wherein the memory stores a computer program, which when executed by the processor causes the processor to operate the computer as a file tree comparator:
  obtaining a first file structure;
  obtaining a second file structure;
  comparing said first file structure to said second file structure;
  generating a sequence log of changes that transform said first file structure to said second file structure; and
  optimizing the sequence log of changes by detecting a creation operation and a deletion operation associated with the same file and replacing the creation operation and the deletion operation with a reparent operation.

2. The method of claim 1 wherein said comparing further comprises:
  recursively walking said first file structure.

3. The method of claim 1 wherein said first file structure is a file tree index.

4. The method of claim 1 wherein said second file structure is a file tree index.

5. The method of claim 1 wherein said comparing further comprises:
  comparing one or more folders of said first file structure along with its children with a corresponding folder along with its children in said second file structure.

6. A system for comparing file tree descriptions comprising:
  a processor executing instructions stored in a memory communicatively coupled to the processor, said processor operating as:
  a file tree comparator performing:
    obtaining and comparing a first file structure to a second file structure;
    generating a sequence log of changes that transform said first file structure to said second file structure; and
    optimizing the sequence log of changes by detecting a creation operation and a deletion operation associated with the same file and replacing the creation operation and the deletion operation with a reparent operation.

7. The system of claim 6 wherein comparing further comprises:
  recursively walking said first file tree structure.

8. The system of claim 6 wherein said first file structure is a file tree index.

9. The system of claim 6 wherein said second file structure is a file tree index.

10. The system of claim 6 wherein comparing further comprises:
  comparing one or more folders of said first file structure along with its children with a corresponding folder along with its children in said second file structure.

11. A computer-readable storage medium storing computer-executable instructions for performing a method of comparing file tree descriptions, said method comprising:
  obtaining a first file structure;
  obtaining a second file structure;

comparing said first file structure to said second file structure;

generating a sequence log of changes that transform said first file structure to said second file structure; and optimizing the sequence log changes by detecting a creation operation and a deletion operation associated with the same file and replacing the creation operation and the deletion operation with a reparent operation.

12. The computer-readable storage medium of claim 11 wherein comparing further comprises:

recursively walking said first file tree structure.

13. The computer-readable storage medium of claim 11 wherein said first file structure is a file tree index.

14. The computer-readable storage medium of claim 11 wherein said second file structure is a file tree index.

15. The computer-readable storage medium of claim 11 wherein comparing further comprises:

comparing one or more folders of said first file structure along with its children with a corresponding folder along with its children in said second file structure.

* * * * *

UNITED STATES PATENT AND TRADEMARK OFFICE
CERTIFICATE OF CORRECTION

| | | |
|---|---|---|
| PATENT NO. | : 7,702,641 B2 | Page 1 of 1 |
| APPLICATION NO. | : 10/021943 | |
| DATED | : April 20, 2010 | |
| INVENTOR(S) | : Brian Holtz et al. | |

It is certified that error appears in the above-identified patent and that said Letters Patent is hereby corrected as shown below:

On sheet 2 of 9, in Figure 2, Box 210, line 3, delete "FILTREE" and insert -- FILETREE --, therefor.

On sheet 5 of 9, in Figure 5, Box 530, line 2, delete "OERATION" and insert -- OPERATION --, therefor.

On sheet 6 of 9, in Figure 6, Box 630, line 2, delete "OERATION" and insert -- OPERATION --, therefor.

In column 5, line 64-65, delete "enviromnents," and insert -- environments, --, therefor.

Signed and Sealed this
Nineteenth Day of April, 2011

David J. Kappos
*Director of the United States Patent and Trademark Office*